US012633559B2

(12) United States Patent
Kornbluth et al.

(10) Patent No.: US 12,633,559 B2
(45) Date of Patent: May 19, 2026

(54) ELECTROCHEMICAL CELL EXHAUST MANAGEMENT SYSTEM

(71) Applicant: Robert Bosch GmbH, Stuttgart (DE)

(72) Inventors: Mordechai Kornbluth, Brighton, MA (US); Daniil Kitchaev, Brookline, MA (US); Tilman Miehle, Waiblingen (DE); Andrea Di Benedetto, Löchgau (DE); Thorsten Stahl, Waiblingen (DE); Charles Tuffile, Swansea, MA (US); Christoph Osemann, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 830 days.

(21) Appl. No.: 18/060,343

(22) Filed: Nov. 30, 2022

(65) Prior Publication Data

US 2024/0178422 A1    May 30, 2024

(51) Int. Cl.
*H01M 8/0662* (2016.01)
*B01D 53/02* (2006.01)
(Continued)

(52) U.S. Cl.
CPC .......... *H01M 8/0662* (2013.01); *B01D 53/02* (2013.01); *B01J 20/041* (2013.01); *B01J 20/20* (2013.01); *H01M 8/04029* (2013.01); *H01M 8/0435* (2013.01); *H01M 8/04716* (2013.01); *H01M 8/2425* (2013.01); *B01D*

*2253/1124* (2013.01); *B01D 2257/60* (2013.01); *H01M 2008/1293* (2013.01)

(58) Field of Classification Search
CPC ............ H01M 8/0662; H01M 8/2425; H01M 8/04029; H01M 8/0435; H01M 8/04716; H01M 2008/1293; B01D 53/02; B01D 2253/1124; B01D 2257/60
See application file for complete search history.

(56) References Cited

U.S. PATENT DOCUMENTS

| | | | |
|---|---|---|---|
| 10,014,531 | B2 | 7/2018 | Xing et al. |
| 10,411,267 | B2 | 9/2019 | Gumeci et al. |

(Continued)

OTHER PUBLICATIONS

Opila et al. J. Phys. Chem. A 2007 doi: 10.1021/jp0647380.

(Continued)

*Primary Examiner* — Christopher P Domone
(74) *Attorney, Agent, or Firm* — BROOKS KUSHMAN P.C.

(57) ABSTRACT

A high temperature electrochemical cell includes a solid electrolyte separating a cathode and an anode, an anode flow field adjacent the anode, a cathode flow field, having an exhaust gas stream pathway, downstream from the cathode, and a thermal management system including a controller programmed to, in response to the exhaust gas stream temperature input, activate at least one component, configured to reduce temperature of the exhaust gas stream to a temperature within a threshold range corresponding to a temperature range promoting condensation of Cr-containing gas into solid, liquid, or aqueous $Cr_2O_3$ and $H_2CrO_4$, the high temperature electrochemical cell having an operating temperature of about 600-1000° C.

20 Claims, 7 Drawing Sheets

(51) Int. Cl.

| | |
|---|---|
| *B01J 20/04* | (2006.01) |
| *B01J 20/20* | (2006.01) |
| *H01M 8/04029* | (2016.01) |
| *H01M 8/0432* | (2016.01) |
| *H01M 8/04701* | (2016.01) |
| *H01M 8/2425* | (2016.01) |
| *H01M 8/12* | (2016.01) |

(56)           References Cited

U.S. PATENT DOCUMENTS

| | | | |
|---|---|---|---|
| 11,380,924 B2 | 7/2022 | Agnew et al. | |
| 2015/0270557 A1* | 9/2015 | He | B01J 20/3204 |
| | | | 429/495 |
| 2020/0119370 A1* | 4/2020 | Ashary | H01M 8/04022 |
| 2021/0202960 A1 | 7/2021 | Hiraiwa et al. | |
| 2021/0257640 A1* | 8/2021 | Hiraiwa | B01J 20/28042 |

OTHER PUBLICATIONS

JANAF thermochemical tables, https://janaf.nist.gov/tables/O-029.html.

Kim et al. En. Env. Sci. 2017 doi: 10.1039/c7ee01782k.

Zhang et al. JAAS 2012 doi:10.1039/C2JA10292G (Alternative conversion coatings to chromate for the protection of magnesium alloys).

Singh, NETL SOFC Program Review 2018 https://netl.doe.gov/sites/default/files/netl-file/FE24-UConn.

Li et al. Water. Res. 2009 doi:10.1016/j.watres.2009.04.008.

Pommiers et al. Corrosion Sci. 2014 doi:10.1016/j.corsci.2014.03.021 (Alternative conversion coatings to chromate for the protection of magnesium alloys).

Beverskog, B., and I. Puigdomenech. Corrosion Science 39.1 (1997): 43-57. doi: 10.1016/S0010-938X(97)89244-X.

* cited by examiner

ELECTROCHEMICAL CELL EXHAUST MANAGEMENT SYSTEM

TECHNICAL FIELD

The present disclosure relates to electrochemical cells such as solid oxide fuel cells (SOFC)s, materials of the exhaust portion of the cells, and management of gases in the exhaust portion of the cells.

BACKGROUND

High temperature electrochemical cells such as SOFC, like most fuel cell technologies, are at the forefront of power generation technology as they benefit the public and the planet by minimizing emissions such as NOx. Compared to proton exchange membrane fuel cell (PEMFC) that may be applicable for automotive applications, SOFCs are typically intended for stationary applications. SOFCs typically feature a relatively high combined heat and power efficiency, long-term stability, fuel flexibility, and low emissions. But SOFC devices run at relatively high operating temperatures, generating harsh operating conditions which have been a challenge from materials perspective. The harsh conditions also generate a need to prevent formation of any undesirable gaseous species in the system, especially in the exhaust.

SUMMARY

In one or more embodiments, a high temperature electrochemical cell is disclosed. The cell includes a solid electrolyte separating a cathode and an anode, an anode flow field adjacent the anode, and a cathode flow field, having an exhaust gas stream pathway, downstream from the cathode. The cell may further include a thermal management system including a controller programmed to, in response to the exhaust gas stream temperature input exceeding a threshold, activate at least one component, configured to reduce temperature of the exhaust gas stream to a temperature within a threshold range corresponding to a temperature range promoting condensation of Cr-containing gas into solid, liquid, or aqueous $Cr_2O_3$ and $H_2CrO_4$. The high temperature electrochemical cell may have an operating temperature of about 600-1000° C.

The at least one component may be a heat exchanger. The at least one component may include a container including an alkaline solution. The at least one component may be a highly porous structure configured to increase surface area available for the condensation. The at least one component may be located in the gas exhaust stream pathway. The temperature range upper limit may be about 120° C. The cell may further include a Cr-getter material. The at least one component may be located downstream from the Cr-getter material. The cell may be a solid oxide fuel cell.

In another embodiment, a solid oxide fuel cell stack is disclosed. The cell stack may include a plurality of cells, at least some of which include a Cr-getter material in an exhaust gas stream pathway and a temperature management system including a controller programmed to, in response to exhaust gas stream temperature input, activate at least one component, located in an exhaust gas stream pathway and configured to reduce temperature of the exhaust gas stream to a temperature within a threshold range corresponding to a temperature range promoting condensation of Cr-containing gas into solid, liquid, or aqueous $Cr_2O_3$ and $H_2CrO_4$. The Cr-getter material may have a formula (Ia):

$$SrNi_yCo_{1-x-y}M_xO_3 \qquad (Ia),$$

where

M is a transition metal, alkali metal, or alkaline earth metal, x is any number between 0.001 and 1.2, and y is any number between 0 and 1.

The Cr-getter material may be located upstream from the temperature management system. The at least one component may be a heat exchanger. The at least one component may include a liquid the exhaust gas stream passes through. The at least one component may be a highly porous structure arranged to increase surface area available for the condensation. The at least one component may be located in a cathode side of the cell.

In yet another embodiment, a high temperature electrochemical cell cathode side is disclosed. The cathode side may include a flow field including gas exhaust stream pathway, a heat exchanger, and a controller programmed to activate a heat exchanger configured to reduce temperature of the exhaust stream to a temperature within a predetermined temperature range promoting condensation of Cr-containing gas into solid, liquid, or aqueous $Cr_2O_3$ and $H_2CrO_4$ in response to the exhaust stream temperature exceeding a threshold, and to recover waste heat by heating a medium. The heat exchanger may be located upstream from the cathode flow field outlet. The cathode side may also include a Cr-getter material. The Cr-getter material may have a formula (Ia):

$$SrNi_yCo_{1-x-y}M_xO_3 \qquad (Ia),$$

where

M is a transition metal, alkali metal, or alkaline earth metal, x is any number between 0.001 and 1.2, and y is any number between 0 and 1.

The cathode side may also include a porous carbon structure.

DETAILED DESCRIPTION

Figure 1:
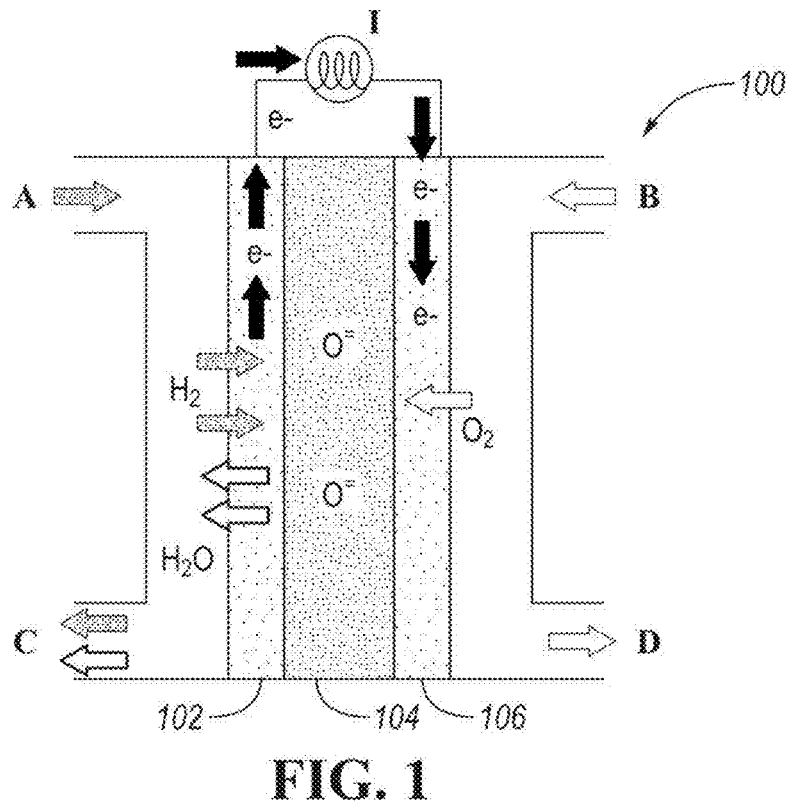
FIG. 1 is a schematic depiction of a non-limiting example of a SOFC.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure. Practice within the numerical limits stated is generally preferred. Also, unless expressly stated to the contrary: percent, "parts of," and ratio values are by weight; the description of a group or class of materials as suitable or preferred for a given purpose in connection with the disclosure implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the disclosure can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A," the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells, or electrochemical cells, that convert chemical energy of a fuel (e.g. $H_2$ and also other types of hydrocarbons for SOFCs) and an oxidizing agent into electricity through a pair of electrochemical half (redox) reactions, have become an increasingly popular alternative to traditional batteries. Several different types of fuel cells have been developed to cover applications such as automotive, portable power systems, smartphones, combined heat and power, or backup power generation.

High temperature electrochemical cells, such as those having operating temperature between about 600 and 1000° C., have several advantages over other types of fuel cells. Example high temperature electrochemical cells may be SOFCs and MCFCs. One such advantage is fuel flexibility of the SOFC. For example, a SOFC may reform methane or use carbon monoxide as a fuel. A SOFC may also better tolerate fuel impurities such as ammonia and chlorides. Sulfur-bearing contaminants, though, remain to be problematic. Additionally, the SOFC reaction is heat-absorbing, thus tending to cool the cell down, which may reduce the need for cooling air.

High temperature electrochemical cells typically feature a relatively high combined heat and power efficiency, long-term stability, fuel flexibility, low emissions, and low cost. High temperature electrochemical cells may operate in temperature ranges of about 750 to 1,200 K or about 500 to 950° C., which may lead to accelerated reactions, but the high temperature may trigger a faster degradation of the components and subcomponents such as interconnects, electrodes, and others. The degradation of the high temperature electrochemical cell components and subcomponents may in turn lead to a drop of the overall cell performance in its lifetime.

SOFCs are devices which produce electricity directly from oxidizing a fuel. Since fuel cells are characterized by their electrolyte material, the SOFC relates to solid oxide or ceramic electrolyte. A schematic depiction of a non-limiting example of a SOFC is in FIG. 1. As can be seen in FIG. 1, the cell 100 includes an anode 102, an electrolyte 104, and a cathode 106. The cell 100 is provided pure hydrogen as fuel at point A on the anode side and air at point B on the cathode side. In another embodiment, other type of hydrocarbons such as methane may be used at point A in the cell 100. At the cathode, oxygen present in the air combines with electrons to form oxygen ions, which diffuse through the electrolyte. At the anode, the ions combine with hydrogen to form water. The additional electrons released in the reaction are diverted to produce electricity. Excess fuel and water leave the cell at point C on the anode side and unused gasses are expelled out at point D on the cathode side. The cells such as the cell depicted in FIG. 1 are typically combined into stacks to provide a desired amount of voltage.

Figure 2:
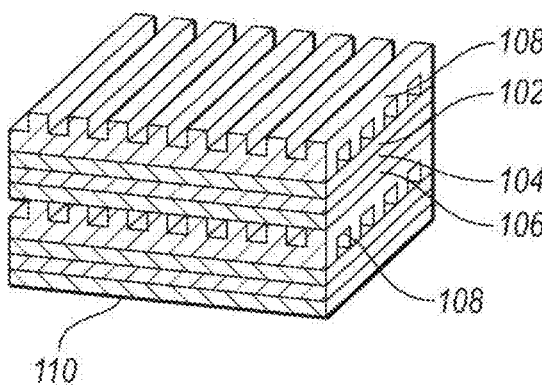
FIG. 2 is a schematic example of a SOFC stack.

A non-limiting schematic depiction of a portion of a SOFC stack 110 is depicted in FIG. 2. As can be seen, FIG.

2 shows spatial distribution of the anode 102, electrolyte 104, and the cathode 106 as well as an interconnect 108 within the SOFC cells and the stack. The interconnect 108 is a SOFC component which is in contact with both the anode 102 and the cathode 106. The interconnect 108, and other components, face a number of challenging environmental conditions in a SOFC stack. For example, the presence of $O_2$/air at the cathode side brings on corrosive conditions which may negatively influence the SOFC components. If the components were not protected, the components' surfaces could suffer from undesirable corrosion and/or metal evaporation.

The components are typically made from a metal. The metal is typically a steel. The steel may be stainless steel. Ferrous materials such as steel may be naturally passivated by surface oxides, also known as rust, including $Fe_2O_3$ and several other metal oxide species. Steel is one of most commonly used materials to fabricate fuel cell components such as PEMC bipolar plate, SOFC interconnect, end plate, gas storage tank, pipe, valve, etc.

To prevent or lessen the degree of metal evaporation or corrosion, high chromium steels with Cr in excess of 12 wt. % have been used because an addition of Cr to a steel composition gives rise to formation of a desirable chromium oxide surface film which provides corrosion resistance to the stainless steel. Preserving the Cr content within the subcomponent may thus contribute to a prolonged cell lifetime by improving corrosion resistance. To achieve preservation of the Cr content, various coatings have been developed. For example, the coatings may include $CO_3O_4$ spinel. The coatings may reduce outward diffusion of Cr or help with reducing oxidation rate for steel the component is made from.

High chromium steels such as 1.4509, AISI 441, X2CrTiNb18 steel may contain about 18 wt. % of Cr. Such stainless steel typically has $Cr_2O_3$ oxide materials at the surface. During the high temperature operation of an electrochemical cell, $Cr_2O_3$ may react with oxygen ($O_2$) and/or water ($H_2O$) that may form chromium vapors as described in Reactions 1-3 below:

$$Cr_2O_3 + 1.5O_2 \rightarrow CrO_3 \quad \text{(Reaction 1)}$$

$$2Cr_2O_3 + O_2 + 4H_2O \rightarrow 4CrO(OH)_2 \quad \text{(Reaction 2)}$$

$$Cr_2O_3 + 1.5O_2 + 2H_2O \rightarrow 2CrO_2(OH)_2 \quad \text{(Reaction 3)}$$

These Cr vapors, namely, $CrO_3$, $CrO(OH)_2$, and $CrO_2$ $(OH)_2$, may further react with oxide materials (e.g., cathode) in various cell components that may further poison and thus reduce the fuel cell longevity, performance, or both. For example, the Cr vapors may lead to cathode degradation which may affect long-term stability of the fuel cell stacks.

The chromium content of the cells has been preserved with materials utilized to prevent chromium entering the cathode and poisoning it, especially at elevated temperatures. Such materials have typically been implemented at the location B shown in FIG. 1.

Among the materials is $SrNiO_x$-coated $Al_2O_3$ fiber which functions as a "chromium getter" material. A "chromium getter" material relates to a material which may capture the undesirable chromium vapors so that chromium present in the fuel cell system does not release during oxidation, and does not increase degree of cathode and/or other degradation. Similarly, $SrCoO_3$ has been identified as a chromium getter. But both materials have limitations such as toxicity due to presence of Co or Ni. Additionally, the materials' performance and effectiveness need improvement. Hence, the materials in their known form may not be the most suitable for high temperature electrochemical cell applications.

Yet, preservation and capture of the chromium content, especially gasses, is important throughout the entire cell stack, for example also at the cathode and anode exhaust sides, locations C and D in FIG. 1. It is known that in the high operating temperature range of the SOFCs or MCFCs, the most prevalent form of gaseous chromium is $CrO_2(OH)_2$ gas. Thus, there is a need to develop additional materials and methods for preserving chromium content within the cells. Additionally, there is a need for a Cr getter material with higher effectiveness and lesser toxicity and environmental impact than the $SrNiO_3$ and $SrCoO_3$. Furthermore, there is a need to identify a Cr getter material that is stable on a metallic support such as stainless steel as well as non-ferrous materials.

In one or more embodiments disclosed herein, an electrochemical cell is disclosed. The cell may be a high temperature electrochemical cell or a cell with an operating temperature of about 600-1000° C. The cell may be a SOFC or a cell that converts chemical energy of a fuel and oxidant directly into electrical energy. The cell may be a MCFC or a cell that uses an electrolyte composed of a molten carbonate salt mixture suspended in a porous, chemically inert ceramic matrix of beta-alumina solid electrolyte.

The cell may be part of a stack including at least a first cell and a second cell. The stack may have additional cells, up to several dozens or hundreds of individual cells arranged in the stack. The stack may have a planar geometry, tubular geometry, or modified planar fuel cells design geometry. The stack may include 2, 3, 4, 5, 6, 7, 8, 9, 10, 15, 20, 25, 30, 35, 40, 45, 50, 55, 60, 65, 70, 75, 80, 85, 90, 95, 100, or more cells.

The cell/stack is structured to reduce/minimize/eliminate chromium content within exhaust gas stream in the cell/stack. To provide this function, the cell/stack may include one or more Cr-getter materials, an exhaust gas stream thermal management system, one or more additional components, or a combination thereof. The cell/stack may be thus structured to capture and/or convert a chromium-containing gas condensate from the exhaust, to maintain the exhaust gas stream within a predetermined temperature range, to increase likelihood of Cr gas condensation, or a combination thereof. The condensate may be converted to a liquid, a solid, or aqueous species, and be removed from the cell/stack. The condensate may be collected at the cathode outlet, anode outlet, or both.

The cell/stack may include at least one component including bulk material. The component may be a cathode, anode, interconnect, a cathode outlet component, and anode outlet component, a cathode exhaust component, an anode exhaust component.

The bulk material may include steel. The steel may be a stainless steel. The steel may be a high chromium steel due to its high electronic conductivity, corrosion resistance, and machinability. The steel may have Cr content of about or at least about 10, 11, 12, 13, 14, 15, 16, 17, 18, 19, 20, 21, 22, 23, 24, 25, or more wt. %, based on the total weight of the steel. The stainless steel may be a stainless steel having a composition SS 304, SS 316, SS 316L, AISI 441, or the like.

SS 304 contains about 18 wt. % Cr and about 8 wt. % nickel (Ni), while SS 316 contains about 16% Cr, about 10 wt. % Ni, and about 2 wt. % molybdenum (Mo). The difference between SS 316 and SS 316L stainless steel is that 316L has about 0.03 wt. % max carbon (C) and is good for welding whereas SS 316 has a mid-range level of C. The stainless steel may include Cr, Ni, Mo, and/or other elements such as carbon (about 0.03 wt. %), manganese (about 1 to 2 wt. %), silicon (about 0.5 to 2 wt. %), nitrogen (about 0.01 to 0.1 wt. %), copper (about 0.5 to 2 wt. %), and cobalt (less than about 0.5 wt. %), where the balance is iron (Fe).

A non-limiting example composition of AISI 441 used in a high temperature electrochemical cell component may be: C (about 0.03 wt. %), Cr (about 17.5 to 19.5 wt. %), Ni, Mn, Si (about 1 wt. % each), N, S (about 0.03 wt. % each), P (about 0.04 wt. %), Ti (about 0.1 to 0.3 wt. %), Nb (about 0.57 to 0.90 wt. %), where the balance is Fe (about 77 wt. %). The steel may be AISI 441 steel with the chemical formula in mol. %: $Fe_{75.6}Cr_{19.4}Si_{1.9}MnNi_{0.9}Nb_{0.4}Ti_{0.3}C_{0.1}N_{0.1}P_{0.1}S_{0.1}$.

The steel may be a low chromium steel having content of Cr less than about, at most about, no more than about 10, 9, 8, 7, 6, 5, 4, 3, 2, or 1 wt. %. The cell/stack may include a carbon steel with trace amounts of Cr. The carbon steel may include about, at least about, or at most about 0.02 to 2.1, 0.14 to 0.84, or 0.59 to 0.65 wt. % of C, Mn of about, at most about, or no more than about 0.3 to 1.65, 0.4 to 0.96, or 0.6 to 1.2 wt. %, Si of up to about 0.6 wt. %, and Cu of up to about 0.6 wt. %. The steel may be substantially free of Cr, Ni, Co, Ti, Nb, and/or Mo. The steel may include trace amounts of one or more of the elements named herein.

The bulk material may include non-steel metals such as aluminum-based material, for example aluminum chromium alloy. The bulk material may include nickel-based alloys, ceramic, or combination thereof.

The at least one component may include a surface portion. The surface portion relates to a layer or film adjacent to the top of the metallic bulk portion. The surface portion may be immediately adjacent to the top of the metallic bulk portion. The depth/thickness of the surface portion may be about 0.5-500, 5-250, or 15-60 μm. The depth/thickness of the surface portion may be about, at least about, or at most about 0.5, 5, 10, 15, 20, 25, 30, 35, 40, 45, 50, 55, 60, 65, 70, 75, 80, 85, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 μm. The layer or film may be continuous or discontinuous. The layer or film may have the same or different thickness across the area covering the bulk material.

The surface portion may include one or more compositions structured as a chromium getter material. The chromium getter may be structured to reduce chromium content in an exhaust gas stream of the cell/stack/system. The one or more compositions may be applied as a continuous or discontinuous layer, islands, spots, in random manner, or in a pattern on the bulk portion. The one or more compositions may be applied within the exhaust portion of the cell in a random manner, in a pattern, or in a gradient. The one or more compositions may be applied in a predetermined manner on a bulk portion of more than one component which forms a part of the cell exhaust on the anode side, cathode side, or both. For example, the surface portion may be included on the exhaust side of the cathode, in the flow field, on a cathode bipolar plate (BPP), at the flow field outlet, and/or the like. In a non-limiting example, the surface portion may be applied to a base component inserted into the exhaust pipe with a porous, honeycomb, or ceramic structure. The porous structure may have pore sizes of about 1 μm-1 mm, 10 μm-500 μm, or 100 μm-200 μm. The porous structure may have pore sizes of about, at least about, or at most about 1, 10, 50, 100, 150, 200, 250, 300, 350, 400, 450, 500, 550, 600, 650, 700, 750, 800, 850, 900, 950, or 1000 µm.

In at least one embodiment, the one or more compositions may cover the entire metallic bulk portion of at least one component. In one or more embodiments, at least one portion of the bulk portion of at least one component may be free of the one or more compositions. The one or more compositions may cover about 1 to 70, 2 to 60, or 5 to 50% of the surface of the metallic bulk portion of at least one component or more than one component, based on the total surface are of the component(s). The one or more compositions may cover about, at least about, or at most about 1, 2, 3, 4, 5, 6, 7, 8, 9, 10, 15, 20, 25, 30, 35, 40, 45, 50, 55, 60, 65, or 70% of the surface of the metallic bulk portion of at least one component or more than one component, based on the total surface area of the component(s).

The chromium getter material/surface portion may be arranged to react with one or more chromium vapor species present in the electrochemical system, stack, cell, or a combination thereof. The chromium vapors may include Cr—O—(H) species, including, but not limited to, CrO, $CrO_3$, $CrO_3H_2$, $CrO_4H_2$, and/or $CrO_3O_2$. The surface portion may be further arranged to react minimally with water, water vapor, humidity within the cell/stack. The chromium getter material/surface portion may be structured to form and/or have stable interface with the bulk material.

The cell/stack may include a combination of chrome-getter materials having different properties. For example, the cell/stack may include a chrome-getter material structured to capture or react with water and thus bind moisture present in the exhaust portion of the cell. At the same time, the cell/stack may also include chrome-getter material(s) structured to capture chromium.

The chromium getter material be a multi-elemental oxide. The chromium getter may be a ternary oxide. The chromium getter material may be a quaternary oxide. The chromium getter may include, comprise, consist essentially of, or consist of one or more compounds/oxides having a general formula (I), (Ia), or both:

$$SrM_xO_3 \qquad \text{(I), or}$$

$$SrNi_yCo_{1-x-y}M_xO_3 \qquad \text{(Ia)}$$

where

M is a transition metal, alkali metal, or alkaline earth metal, x is any number between 0.001 and 1.2, and y is any number between 0 and 1.

In the formulas (I), (Ia) x may be 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.25, 0.3, 0.35, 0.4, 0.45, 0.5, 0.55, 0.6, 0.65, 0.7, 0.75, 0.8, 0.85, 0.9, 1.0, 1.05, 1.10, 1.15, or 1.2. x may be any number between 0.001 and 1.2. $0.001 < x < 1.2$. x may be any range between two numerals disclosed herein.

In the formulas (I), (Ia) y may be 0, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1. y may be any number between 0 and 1. y may be greater than $0.0 \leq y \leq 1$. y may be any range between two numerals disclosed herein.

In the formulas (I), (Ia) M may be an element from I.A, II.A, II.B, VI.B, or VII.B group of the Periodic Table of Elements. M may be an element from the third, fourth, or sixth period of the Periodic Table of Elements. M may be at least one of Re, W, Ca, Zn, Na, Mg, or their combination.

Non-limiting example compounds of formulas (I), (Ia) may include $SrCa_{0.1}Co_{0.9}O_3$, $SrCo_{0.9}Re_{0.1}O_3$, $Na_{0.1}SrCo_{0.9}O_3$, $SrCa_{0.1}Ni_{0.9}O_3$, $SrMg_{0.1}Co_{0.9}O_3$, $Sr_{0.9}Ca_{0.1}CoO_3$, $SrCoO_3$, $SrZn_{0.1}Co_{0.9}O_3$, $SrCo_{0.9}W_{0.1}O_3$, $Na_{0.1}SrNi_{0.9}O_3$, $Sr_{0.9}CoRe_{0.1}O_3$, $SrMg_{0.1}Ni_{0.9}O_3$, $SrZn_{0.1}Ni_{0.9}O_3$, $Na_{0.1}Sr_{0.9}CoO_3$, $Sr_{0.9}Ca_{0.1}NiO_3$, $Sr_{0.9}Mg_{0.1}CoO_3$, $SrNiO_3$, or $SrRe_{0.1}Ni_{0.9}O_3$.

The chromium getter material may be a perovskite material. The material may have a perovskite crystal lattice or a network of corner-sharing $BX_6$ octahedra that crystallize with a general $ABX_3$, or similar, stoichiometry. The perovskite chromium getter may have a general formula (II):

$$(Ba,Sr)(Mo,Zr)O_3 \qquad \text{(II)}.$$

Non-limiting example compounds of formula (II) may include $BaMoO_3$, $BaZrO_3$, $SrMoO_3$, $SrZnO_3$, (Ba, Sr)$MoO_3$, (Ba, Sr)$ZrO_3$, Ba(Mo, Zr)$O_3$, or Sr(Mo, Rz)$O_3$.

The chromium getter material may include, comprise, consist essentially of, or consist of one or more compounds/oxides having a general formula (III):

$$M_xA_zO_y \qquad \text{(III)},$$

where

A is B or Sb,

M is a transition metal or alkaline earth metal, x is any number between 0.1 and 10, y is any number between 0.5 and 10, and z is any number between 1 and 2.

In the formula (III), x may be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10. x may be any number between 0.1 and 10. $0.1 < x < 10$. x, y may be any range between two numerals disclosed herein.

In the formula (III), y may be 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10. y may be any number between 0.5 and 10. $0.5 < y \leq 10$. y may be any range between two numerals disclosed herein.

In the formula (III), z may be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In the formula (III), M may include an element from II.A, VII.A, III.B, or VIII.B group of the Periodic Table of Elements. M may be an element from the third, fourth, or fifth period of the Periodic Table of Elements. M may be Co, Fe, Mg, Mn, or Y.

Non-limiting example compounds of formula (III) may include $Co(SbO_2)_2$, $Mg(SbO_2)_2$, $Yb_3SbO_7$, $Fe_3BO_5$, $Fe_2B_2Os$, or $Mn_3(BO_3)_2$.

One or more compounds identified within the formulas (I), (Ia), (II), and/or (III), may be expressly excluded from the Cr-gutter material disclosed herein. The exclusions may be, for example, due to toxicity or environmental concerns. Example excluded compounds may include $SrCoO_3$ and/or $SrNiO_3$. The material of formulas (I), (Ia), (II), and/or (III) may be cobalt free, nickel free, or both.

The material of formulas (I), (Ia), (II), and/or (III) may be further modified to include an oxygen vacancy of at least 1% off-stoichiometry to enhance oxide diffusion. Additionally, or in the alternative, the surface portion may be further enhanced with an additional amount of Bi to enhance water stability, Sr to enhance substrate stability, or both.

The chromium getter material may include only one of the materials of formulas (I), (Ia), (II), and (III). In another embodiment, the chromium getter material may include the material of a combination of the formulas (I), (Ia), (II), and/or (III). The chromium getter material may include more than about 25-75, 30-70, or 35-65% of the material of one or the formulas, for example formula (I) and/or less than about 50, 40, 35, 30, 25, 20, 15, or 10% of the other materials. In a non-limiting example, the surface portion of at least one component may include a greater amount of formula (I) or (Ia) than an amount of formula (II) and/or (III). In another non-limiting example, the surface portion of at least one component may include material of formula (II) or (III). In yet another example, the surface portion may include a combination of formulas (I) or (Ia), (II), and (III) in equal or unequal amounts.

The Cr-getter materials identified herein may be used to react with the identified gaseous species including Cr such as $CrO_2(OH)_{2(g)}$ to lower the concentration of $Cr^{6+}$ in the exhaust gas stream to below the desired threshold even at higher temperatures, e.g. as in System 1, shown in FIG. 3, as is explained in more detail below.

Alternatively, or in addition, the system/cell/stack may include one or more additional components structured to increase likelihood of Cr condensation, deposition, reduction, or a more general reaction which reduces concentration of Cr in the exhaust gas stream. For example, the one or more additional components may be arranged to cool the cell exhaust to a sufficiently low temperature (e.g. from "System 1" to "System 2" in FIG. 3) such that the system may thermodynamically equilibrate to the conditions of Scenario 1, ensuring that the concentration of unwanted chromium gas species remains below the predetermined threshold.

The one or more additional components may be structured to manage/adjust/decrease/maintain temperature at or below a predetermined level or range. The predetermined temperature may be 120° C., indicated in FIG. 3. At or below the temperature 120° C., chromium is prone to staying out of the exhaust gas stream as condensation into chromium oxide $(Cr_2O_3)$ or chromic acid $(H_2CrO_4)$ is promoted.

The one or more additional components may be incorporated on the cathode side, anode side, or both. The one or more additional components may be incorporated in each cell, every other cell, at least one cell, more than one cell, a plurality of cells, or adjacent to a plurality of cells within the stack/system. The one or more additional components may be a component of the stack or system including one or more Cr-getters, those described herein and others. Alternatively, the one or more additional components may be present in a system free of a Cr-getter material. The one or more additional components may be a singular way to decreased, minimize, or eliminate presence of Cr in the exhaust gas stream.

The one or more additional components may include a thermal/temperature management system. The system may include one or more heat exchangers. A heat exchanger is a system used to transfer heat between a source and a working fluid. The heat exchanger may contain less than about 5 wt. % Cr, based on the total weight of the heat exchanger material. The heat exchanger may be any heat exchanger suitable for an electrochemical cell environment, and compatible with the cell/stack/system described herein. The heat exchanger may be a plate heat exchanger, shell heat exchanger, tube exchanger, co-axial heat exchanger, or the like.

The heat exchanger may be used to cool down the exhaust stream to or below the temperature. The heat exchanger may be maintained at or below the threshold temperature. The heat exchanger may be further structured to promote thermodynamic equilibration and recover waste heat by heating air, water, or another medium. The heat exchanger may be located in, at, near, adjacent to, aligned with the exhaust gas stream pathway.

The heat exchanger may be combined with the chrome-getter material(s) disclosed herein. For example, the heat exchanger may be placed downstream from the one or more Cr-getters, further enhancing the Cr-removal capacity of the system. The Cr-getter material may be located upstream from the heat exchanger.

The one or more additional components/thermal management system may include a container with a liquid. The container may be a tank, cell, pipe, vessel, channel, receptacle, conduit, chamber, or duct connected to the flow path of the exhaust stream. The exhaust stream may be bubbled through the liquid. The liquid may be water or an alkaline solution such as KOH, NaOH dissolved in water or another solvent to promote chromium condensation.

The cell/stack/thermal management system may also include a source of electrochemical voltage and/or temperature which is applied to a cell component, for example a component having the surface portion, to increase likelihood of Cr condensation, deposition, reduction or general reaction.

The thermal management system may include one or more controllers and sensors. The one or more controllers may have one or more processing components such as one or more microprocessor units which enable the controllers to process input data. The one or more controllers may be programmed to operate the one or more additional components named herein. The controller(s) may be programmed to manage, adjust, alter, decrease, maintain temperature at or below a predetermined/threshold level or within a predetermined/threshold range. The adjusting or altering may include single or multiple instances of adjustment. The adjusting may occur in regular or irregular intervals, based on the input received from the one or more sensors.

The one or more controllers may be programmed to determine a threshold value to initiate cooling, maintain cooling, and/or terminate cooling of the electrocatalyst. The threshold value may be based on the temperature of the exhaust gas stream in one or more locations of the exhaust gas pathway indicated by one or more sensors. The threshold value may be such temperature which may decrease likelihood of Cr condensation, deposition, reduction or general reaction.

The predetermined/threshold temperature may be a range corresponding to a temperature range promoting condensation of Cr into $Cr_2O_3$ and $H_2CrO_4$. The controller may be programmed to utilize, activate, deactivate one or more of the additional components described herein for the managing, adjusting, altering, decreasing, or maintaining the temperature. The controller may be managing, adjusting, altering, decreasing, maintaining based on initial input, input data collected from one or more sensors, derived data, or a combination thereof. The one or more controller(s) may be incorporated within the one or more additional components, for example the heat exchanger.

The one or more controllers may be programmed to activate and deactivate the at least one component, in response to input from one or more sensors, derived data based on the input, or both.

The one or more sensors may be provided in the exhaust gas stream pathway and provide information to the one or more controller(s). The sensors may include one or more types of sensors. The sensors may be structured to measure temperature of the exhaust gas stream, cathode, anode, membrane, flow field, BPP, heat exchanger, tail gas burner, or their combination. The sensors may be installed in various locations throughout the exhaust gas stream pathway.

The one or more additional components and/or the thermal management system may include a highly porous or channel structure included in the exhaust portion of the cell, in the pathway of the exhaust stream, in the flow field, bipolar plate, or both. The highly porous structure may be a honeycomb ceramic base. The highly porous structure may have pore sizes of about 1 μm-1 mm, 10 μm-500 μm, or 100 μm-200 μm. The highly porous structure may have pore sizes of about, at least about, or at most about 1, 10, 50, 100, 150, 200, 250, 300, 350, 400, 450, 500, 550, 600, 650, 700, 750, 800, 850, 900, 950, or 1000 μm.

The highly porous structure may be a permanent structure in the pathway of the exhaust stream. The highly porous structure may be arranged to increase the surface area available for condensation, thus promoting condensation into $Cr_2O_3$ or chromic acid, enhance diffusion and deposition along the pores/channels, or a combination thereof, rather than leaving chromium in the gas stream. The highly porous material may include porous carbon material, cordierite, or another ceramic substrate. The highly porous material may be coated with an aluminum-chromium alloy or another anticorrosive coating. The coating may be about 1 μm-1000 μm, 10 μm-500 μm, or 100 μm-200 μm thick. The coating thickness may be of about, at least about, or at most about 1, 10, 50, 100, 150, 200, 250, 300, 350, 400, 450, 500, 550, 600, 650, 700, 750, 800, 850, 900, 950, or 1000 μm.

The one or more additional components may be one or more sacrificial compounds incorporated in the exhaust stream pathway. "Sacrificial" relates to a compound that is consumed by the reactions and is not further present in the system after the reaction(s) the compound is part of take place. The sacrificial compound may be reactive or highly reactive with the chromic acid such that any chromic acid would be further converted into benign species. The product of the reaction of the sacrificial compound and the chromic acid could be removed from the system, either by itself or as part of a replacement process of the component.

Figures 8, 9:
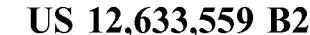
FIG. 8 is a schematic depiction of a non-limiting example of a SOFC with a non-limiting example depiction of the area having one or more components and or chrome getter materials according to one or more embodiments disclose herein.
FIG. 9 is a schematic depiction of a non-limiting example of a molten carbonate fuel cell (MCFC) with a non-limiting example depiction of the area having one or more components and or chrome getter materials according to one or more embodiments disclose herein.

FIG. 8 shows a schematic SOFC 200, according to one or more embodiments disclosed herein, having the cathode 206, anode 202, electrolyte 204, the exhaust gas outlet on the cathode side 208, the exhaust gas outlet on the anode side 210, and an external circuit 211. FIG. 8 also shows a non-limiting example of a location of the one or more additional components such as the heat exchanger, sacrificial compound, porous or channel material, container with a liquid, designated as 212. The one or more Cr-getter materials may be also or alternatively included in the area 212 or downstream from the area 212. The area 212 is only schematically shown, not to scale, and is a non-limiting example of the placement within the cell 200. The external circuit 211 may provide voltage to the one or more additional components of the area 212. Alternatively, the one or more additional components may have a dedicated voltage source 213. The one or more controllers 214 and/or sensors 215 may be located within the area or outside of the area.

Similarly, FIG. 9 shows schematic MCFC 300, according to one or more embodiments disclosed herein, having the cathode 306, anode 302, electrolyte 304, the exhaust gas outlet on the anode side 310, and an external circuit 311. The influx of hydrogen gas is at location A, influx of oxygen at B, water and heat leave the cell at C, and carbon dioxide influx is at D. A non-limiting location of the one or more additional components such as the heat exchanger, sacrificial compound, porous or channel material, container with a liquid, designated as 312, is shown. The area 312 is only schematically shown, not to scale, and is a non-limiting example of the placement within the cell 300. The external circuit 311 may provide voltage to the one or more additional components of the area 312. Alternatively, the one or more additional components may have a dedicated voltage source 313. The one or more controllers 314 and/or sensors 315 may be located within the area or outside of the area. A non-limiting example location of the area may be in the downstream exhaust from the $CO_2$ flow.

A method of decreasing or eliminating Cr in the exhaust gas stream is disclosed herein. The method may include increasing likelihood of Cr condensation, deposition, reduction, or a more general reaction which reduces concentration of Cr in the exhaust gas stream. The method may include incorporating one or more Cr-getter materials, one or more additional components named herein, or both into the cell/stack/system.

The method may include designing an electrochemical cell such as a SOFC cell and/or stack utilizing the components enhanced with the Cr-getter material and/or one or more additional components for a particular application.

The method may include producing the enhanced cell components including the surface portion having one or more materials of formulas (I), (Ia), (II), and/or (III). The method may further include manufacturing at least one cell component having the one or more compositions disclosed herein. The method may include providing a predetermined amount of the one or more compounds of the formulas (I), (Ia), (II), and/or (III) in the surface portion on the metallic bulk portion of a component of a cell.

To impart the predetermined amount of the one or more compounds of the formulas (I), (Ia), (II), and/or (III) to at least a portion of the metallic bulk portion of a component, a number of techniques may be used. For example, the materials of the formulas (I), (Ia), (II), and/or (III) may be deposited by sputtering, vacuum processing, electrochemical deposition, electroplating, solution processing, or as a washcoat.

The method may include applying a screen, mask, or filter where only partial application is desired. The method may include depositing a screen over one component, depositing the entire amount of the materials forming the surface portion, and etching away the screen. The etching may include etching away regular intervals of the surface portion. The method may further include annealing at a temperature above about 100° C. to reduce the number of defects in the surface portion.

The method may include providing a source of electrochemical voltage and/or temperature to be applied to a cell component, for example a component having the surface portion, to increase likelihood of Cr condensation, deposition, reduction or general reaction.

The method may include providing a heat exchanger, maintaining the heat exchanger within a predetermined temperature range below the temperature at which concentration of Cr in the exhaust gas stream exceeds a permitted limit. The method may include providing a liquid and bubbling the exhaust gas stream through the liquid. The method may include providing a sacrificial compound arranged to react with one or more Cr condensed species. The method may include providing one or more highly porous structures of materials within the cell, flow field, exhaust side components to increase condensation by providing an increased surface area via which the exhaust stream passes on the way to the cell outlet.

The advantage of the herein-described high temperature electrochemical cell stack includes (a) reduction and/or elimination of unwanted chromium gas species from the system at an increased efficiency and/or decreased cost.

Experimental Section $CrO_2(OH)_2$ Condensation Under Various System Designs

Condensation of gaseous $Cr^{6+}$ in the form of $CrO_2(OH)_2$ was considered via three scenarios:

$$4CrO_2(OH)_{2,(g)} \rightarrow 2Cr_2O_{3(s)} + 4H_2O_{(g)} + 3O_{2,(g)} \qquad \text{Scenario 1:}$$

$$CrO_2(OH)_{2,(g)} \rightarrow [H_2CrO_4]_{(l)} \leftrightarrow [HCrO_4]^-_{(aq)} + H^+_{(aq)} \qquad \text{Scenario 2:}$$

$$\text{Cr-getter: } CrO_2(OH)_{2,(g)} + X_{(s)} \rightarrow CrX_{(s)} + aH_2O_{(g)} + bO_{2,(g)} \qquad \text{Scenario 3:}$$

The subscripts (g), (s), (l), (aq) denote gaseous, solid, liquid, and aqueous phases respectively. In the Cr-getter scenario, compounds X and CrX denote a Cr-getter material in its pristine state and Cr-absorbed state respectively, while the stoichiometric coefficients a and b are defined to balance the chemical reaction for a particular Cr-getter material.

Scenarios 1 and 2 correspond to two possible mechanisms of $Cr^{6+}$ condensation in the system. In Scenario 1, $Cr^{6+}$ was reduced to its thermodynamic equilibrium state, $Cr_2O_3$ alongside the evolution of water and oxygen gas. In Scenario 2, $Cr^{6+}$ only condensed from a gaseous to a liquid or solvated state but did not undergo reduction. Due to the lack of electron transfer, Scenario 2 was assumed to be a fast process, likely to occur in all experimental embodiments. Scenario 1 on the other hand was assumed to be a slower process relevant to system designs that allow for thermodynamic equilibrium to be reached. Scenario 3 was provided as relevant to a system where a Cr-getter material had been deliberately introduced into the system.

Each of the three condensation scenarios lead to an expected concentration of gaseous $Cr^{6+}$ determined by the thermodynamic equilibrium between the gaseous $CrO_2(OH)_2$ molecule and the condensation product. This concentration was computed by assuming that the condensation reaction reached its local equilibrium state, where the chemical potential of the $CrO_2(OH)_2$ was equal to that of the condensation products.

The chemical potential of $CrO_2(OH)_2$ was approximated by the expression $$\mu_{CrO2(OH)2(g)} = h^0_{CrO2(OH)2(g)} - T\left(s^0_{CrO2(OH)2(g)} - R\ln p_{CrO2(OH)2(g)}\right)$$

where $$h^0_{CrO2(OH)2} = -760 \text{ kJ/mol and } s^0_{CrO2(OH)2} = 337.6 \text{ J/mol K}$$

are the standard enthalpy and entropy of $CrO_2(OH)_{2(g)}$, $p_{CrO2(OH)2}$ is the partial pressure of $CrO_2(OH)_{2(g)}$, R=8.3144 J/mol K is the ideal gas constant, and T is the temperature in Kelvin. The chemical potentials of the condensation products in Scenarios 1 and 2 are given as follows:

$$\mu_{Cr2O3(s)} = h^0_{Cr2O3(s)} - Ts^0_{Cr2O3(s)}$$

$$\mu_{H2CrO4(l)} = h^0_{H2CrO4(l)} - Ts^0_{H2CrO4(l)}$$

$$\mu_{H2O(g)} = h^0_{H2O(g)} - T\left(s^0_{H2O(g)} - R\ln p_{H2O(g)}\right)$$

$$\mu_{O2(g)} = h^0_{O2(g)} - T\left(s^0_{O2(g)} - R\ln p_{O2(g)}\right)$$

where their thermodynamic values are taken to be $$h^0_{Cr2O3(s)} = -1134 \text{ kJ/mol,}$$

$$s^0_{Cr2O3(s)} = 80.65 \text{ J/mol K,}$$

$$h^0_{H2CrO4(l)} = -854 \text{ kJ/mol,}$$

$$s^0_{H2CrO4(l)} = 311 \text{ J/mol K,}$$

$$h^0_{H2O(g)} = -242 \text{ kJ/mol,}$$

$$s^0_{H2O(g)} = 188.8 \text{ J/mol K,}$$

$$p_{H2O(g)} = 0.07,$$

$$h^0_{O2(g)} = 0,$$

$$s^0_{O2(g)} = 205.2 \text{ J/mol K,}$$

$$p_{O2(g)} = 0.23$$

based on literature and representative conditions of a fuel cell exhaust stream.

Figure 3:
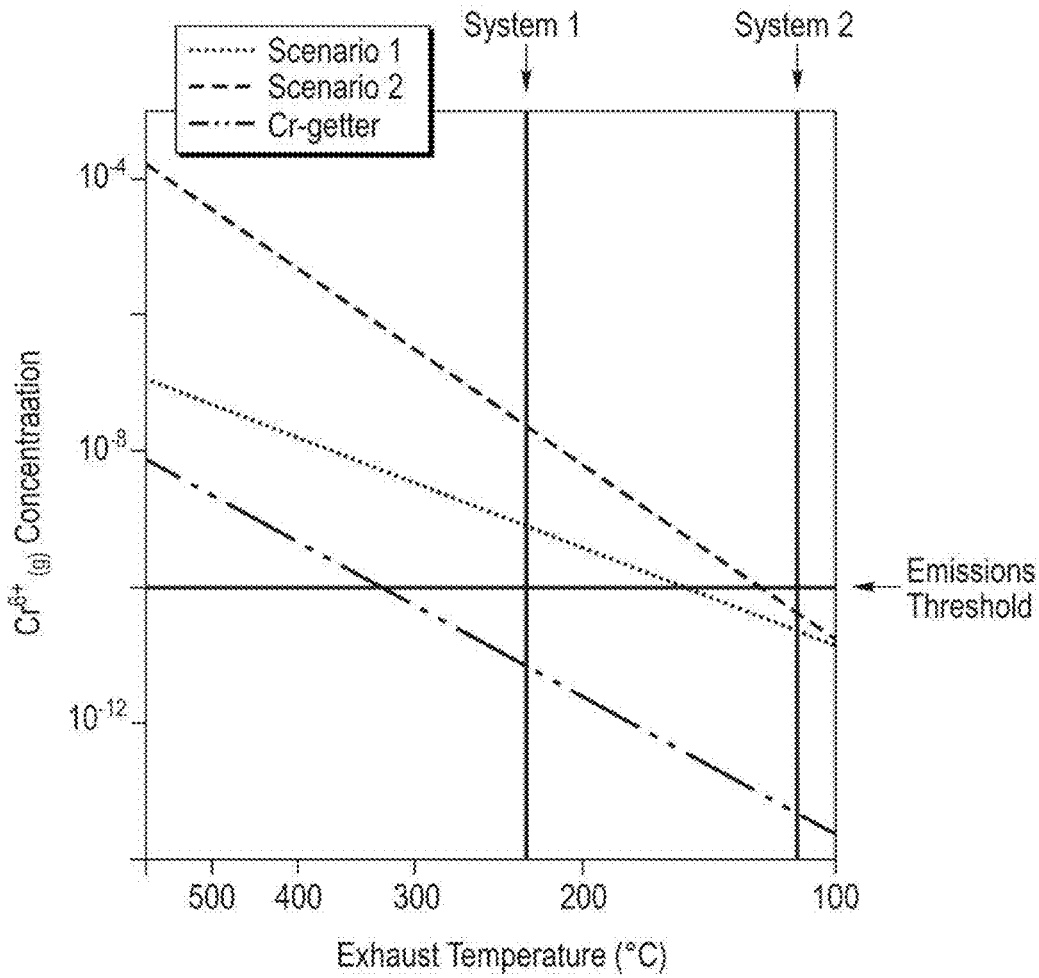
FIG. 3 is a plot showing concentration of gaseous $Cr^{6+}$ in the form of $CrO_2(OH)_{2(g)}$ in three condensation scenarios compared to a preset emissions threshold and two representative fuel cell system configurations.

FIG. 3 shows the gaseous $Cr^{6+}$ concentration in the two condensation scenarios resulting from this thermodynamic analysis. Furthermore, FIG. 3 shows the effect of a potential Cr-getter material, where the Cr-getter chemical potential is taken to be 20 kJ/mol lower than that of $Cr_2O_3$ as a representative example. The vertical lines "System 1" and "System 2" in FIG. 3 denote two possible fuel cell systems or configurations, differing in the temperature of their outlet stream. The horizontal line "Emissions threshold" denotes one possible threshold of $Cr^{6+}$ concentration in the exhaust stream which is currently $10^{-10}$ molar fraction.

FIG. 3 illustrates that one way to reduce the chromium emission exhaust concentration is to ensure that the fuel cell exhaust is cooled to a sufficiently low temperature (e.g. from "System 1" to "System 2") and allowed to thermodynamically equilibrate to the conditions of Scenario 1. An alternative solution is to introduce an appropriate Cr-getter material with a sufficiently strong reaction energy with $CrO_2(OH)_{2(g)}$ to lower the concentration of chromium emissions in the gas to below the desired threshold even at higher temperatures, e.g. as in System 1.

New Cr-Getter Material Identification and Testing

The one or more oxides of formula (I) were identified using publicly available materials database to screen for the optimal materials, and high-throughput (HT) first-principles density functional theory (DFT) was used to calculate the results to evaluate and identify suitable Cr-getters materials. The following screening criteria were used:

1. Reactivity Metric

This is a composite of the following metrics, with a positive number corresponding to a "better" material for a purpose.

a. Reactivity to $CrO_2(OH)_2$, with a positive number meaning there is a favorable enthalpy of reaction and stoichiometry of Cr consumption. Cr consumption was overweight for this purpose.

b. Reactivity to $H_2O$, with a positive number meaning there is an unlikely enthalpy of reaction and stoichiometry of water consumption. The enthalpy was overweight for this purpose to ensure that there was hardly any reaction. Reactivity with water vapor/humidity in the system in undesirable. This property is unique to the exhaust system.

c. Reactivity to $Al_2O_3$, which is the approximate surface structure of both alumina and aluminum chromium alloy. A positive number corresponds to a favorable reaction, which is therefore a favorable interface. A positive number thus indicates formation of a stable interface.

$SrCoO_3$, a known Cr-getter, was chosen as the reference material with the goal of identifying a Cr-getter material having one or more properties exceeding $SrCoO_3$ performance. All stable $A_xB_{2-x}O_{2<y<6}$ in the database with <$20/kg elemental cost were searched with 1937 materials identified.

TABLE 1

Reactivity screening examples

| Reactant | Example formula | Most stable reaction | MS reactant ratio [molar] | MS reactant ratio [wt.] | MS reaction energy [eV/at] |
|---|---|---|---|---|---|
| $Cr(HO_2)_2$ | $SrCoO_3$ | 0.5455 $SrCoO_3$ + 0.4545 $Cr(HO_2)_2$ -> 0.09091 $Sr(H_2O_3)_2$ + 0.5455 $CoHO_2$ + 0.4545 $SrCrO_4$ | 0.833 | 0.505 | −0.147 |
| $Cr(HO_2)_2$ | $Ce_5Zr_3O_{16}$ | No reactions found | 0.0 | 0.0 | 0.0 |
| $Cr(HO_2)_2$ | $Ce_3ZrO_8$ | No reactions found | 0.0 | 0.0 | 0.0 |
| $Cr(HO_2)_2$ | $Li_6Fe_5O_{12}$ | 0.4 $Li_6Fe_5O_{12}$ + 0.6 $Cr(HO_2)_2$ -> 0.2 $FeHO_2$ + 0.6 $Li_4CrFe_3O_8$ + 0.75 O2 + 0.5 $H_2O$ | 1.5 | 0.345 | −1.074 |
| $Cr(HO_2)_2$ | $Sr(ClO_3)_2$ | 0.6667 $Sr(ClO_3)_2$ + 0.3333 $Cr(HO_2)_2$ -> 0.2222 $H_3ClO_5$ + 0.3889 $Cl_2O_7$ + 0.08333 $O_2$ + 0.3333 $Sr_2CrClO_4$ | 0.5 | 0.232 | −0.884 |

In Table 1, MS relates to the term "most stable." As the examples show, some materials such as $Sr(ClO_3)_2$ and $Li_6Fe_5O_{12}$ react strongly with chromium, other examples such as $SrCoO_3$ react moderately, and other example such as $Ce_5Zr_3O_{16}$ and $Ce_3ZrO_8$ do not react with chromium at all.

2. Oxygen Instability Metric

Oxygen instability is the energy of excess or deficient oxygen, based on the oxygen chemical potential and the temperature. Oxygen in/stability screening relates to the chemical potential of oxygen at a given stoichiometry compared to the oxygen chemical potential at room temperature. The oxygen chemical potential for an oxide is defined by the grand potential phase diagram, which describes the relative energy of adding or subtracting oxygen relative to the other element(s). To compensate for computational errors, each binary oxide was benchmarked individually, and thereby a room-temperature chemical potential was identified for an arbitrary metal oxide. The change with pressure and temperature is well-known from experimental data. We can therefore measure the excess energy of oxygen relative to its chemical potential at a fixed temperature, and pressure may be measured in eV and marked as "instability energy."

The oxygen instability screening revealed some materials performing better at higher temperatures and other materials performing better at lower temperatures. The vast majority of materials was either high performing at both or underperforming at both.

Figure 4:
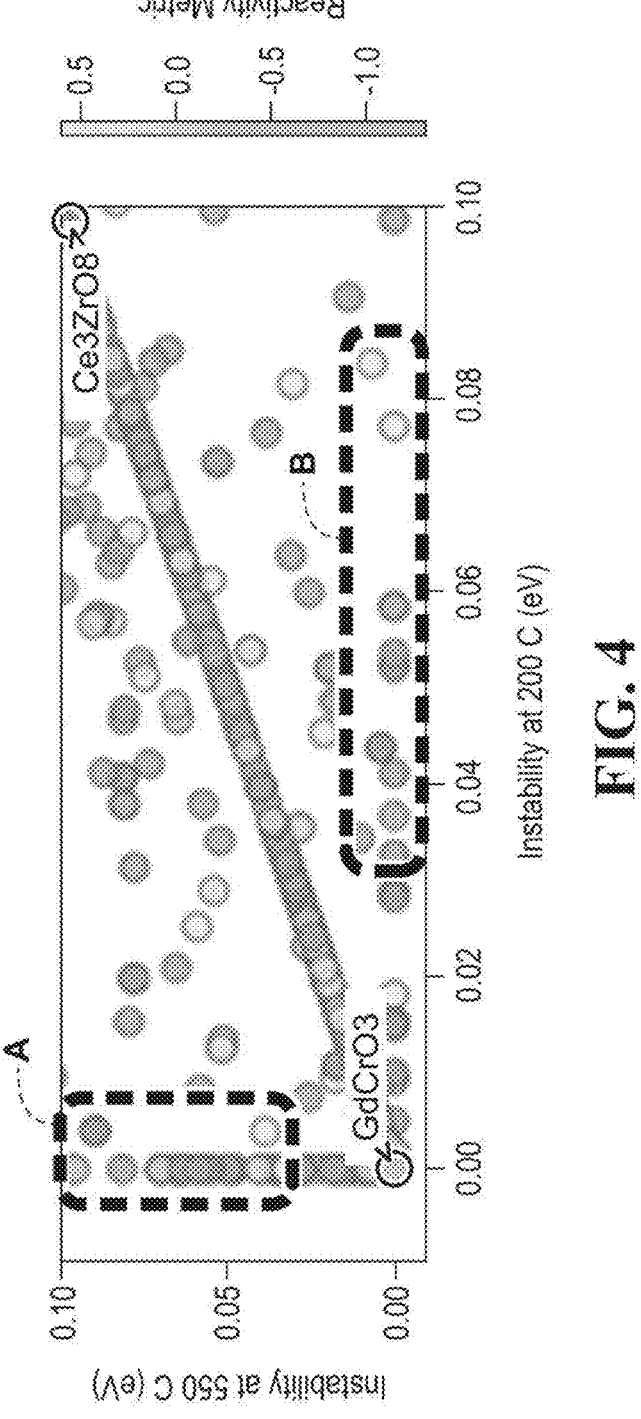
FIG. 4 shows a temperature-based reactivity and stability plot for tested materials.

The results of the oxygen instability screening are shown in FIG. 4. As can be seen in the plot of FIG. 4, materials designated with lighter colors have better reactivity with $CrO_2(OH)_2$ and worse reactivity with $H_2O$. Group A relates to materials unstable at 550° C. but stable at 200° C. Group B relates to materials stable at 550° C. but unstable at 200° C.

3. Cost Metric

The cost, considered as the elemental cost in USD/kg, was evaluated for promising materials having satisfactory results of reactivity and oxygen instability.

Final Rankings

Figure 5:
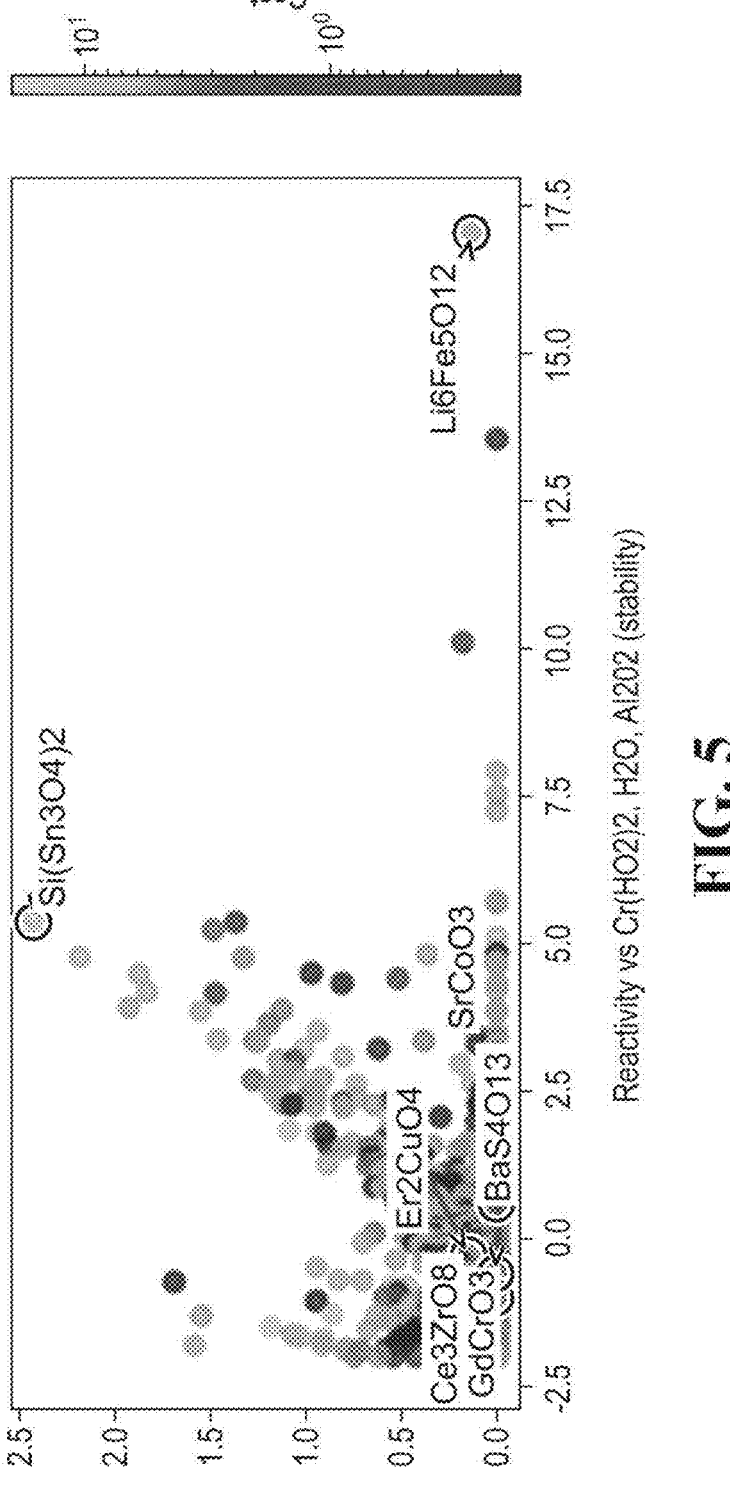
FIG. 5 shows an oxygen instability, reactivity, and cost plot for the tested materials.

The above screening yielded results shown in FIG. 5, visually showing placement of the 1937 screened materials with respect to the reactivity, oxygen instability, and cost. The sought-after materials were located in the left lower corner, having high reactivity with $Cr(HO_2)_2$ and $Al_2O_3$, low reactivity with $H_2O$, low oxygen instability, and low cost.

The results were further screened under the following criteria:

(a) Oxygen instability<0.001 eV/atom;

(b) Cost<20 USD/kg elemental;

(c) $Cr(OH)_2O_2$ reaction<−0.1 eV/atom (reactive);

(d) $H_2O$ reaction>−0.001 eV/atom (nonreactive); and (e) $Al_2O_3$ reaction<−0.01 eV/atom (reactive, to prevent delamination).

Table 2 shows top 20 materials.

TABLE 2

Formulas and properties of example Cr-getter candidate materials

| Example material formula | Overall reactivity metric vs $Cr(HO_2)_2$, $H_2O$, $Al_2O_3$ | Oxygen Instability at 200° C. [eV/at] | Oxygen Instability at 550° C. [eV/at] | Cost [USD/kg] | $Cr(HO_2)_2$ reaction energy [eV/at] | $H_2O$ reaction energy [eV/at] | $Al_2O_3$ reaction energy [eV/at] |
|---|---|---|---|---|---|---|---|
| Desirable value | — | low | low | low | high | low | high |
| $SrMoO_3$ | 3.463 | 0.0 | 0.0 | 19.116 | −0.297 | 0.0 | −0.026 |
| $Co(SbO_2)_2$ | 3.304 | 0.0 | 0.0 | 9.149 | −0.284 | 0.0 | −0.036 |
| $Mg(SbO_2)_2$ | 3.192 | 0.0 | 0.0 | 4.448 | −0.28 | 0.0 | −0.004 |
| $Fe_{17}O_{18}$ | 2.998 | 0.0 | 0.0 | 0.357 | −0.266 | 0.0 | −0.031 |

TABLE 2-continued

Formulas and properties of example Cr-getter candidate materials

| Example material formula | Overall reactivity metric vs Cr(HO$_2$)$_2$, H$_2$O, Al$_2$O$_3$ | Oxygen Instability at 200° C. [eV/at] | Oxygen Instability at 550° C. [eV/at] | Cost [USD/kg] | Cr(HO$_2$)$_2$ reaction energy [eV/at] | H$_2$O reaction energy [eV/at] | Al$_2$O$_3$ reaction energy [eV/at] |
|---|---|---|---|---|---|---|---|
| Fe$_9$O$_{10}$ | 2.609 | 0.0 | 0.0 | 0.355 | −0.245 | −0.001 | −0.03 |
| Mn(AsO$_2$)$_2$ | 2.518 | 0.0 | 0.001 | 0.965 | −0.239 | 0.0 | −0.002 |
| Co(AsO$_2$)$_2$ | 2.227 | 0.0 | 0.033 | 7.671 | −0.218 | 0.0 | −0.037 |
| CO$_2$As$_2$O$_5$ | 2.035 | 0.044 | 0.004 | 11.584 | −0.209 | 0.0 | −0.046 |
| Cr$_2$P$_2$O$_7$ | 1.913 | 0.0 | 0.0 | 4.177 | −0.208 | 0.0 | −0.042 |
| Ti(FeO$_2$)$_2$ | 1.708 | 0.065 | 0.065 | 2.629 | −0.197 | 0.0 | −0.019 |
| Eu$_2$Mn$_2$O$_5$ | 1.484 | 0.0 | 0.0 | 19.756 | −0.186 | 0.0 | −0.046 |
| Zn$_3$(AsO$_3$)$_2$ | 1.218 | 0.0 | 0.0 | 1.503 | −0.167 | 0.0 | −0.029 |
| Yb$_3$SbO$_7$ | 1.086 | 0.091 | 0.206 | 12.749 | −0.157 | 0.0 | −0.025 |
| BaPbO$_3$ | 1.031 | 0.0 | 0.127 | 1.162 | −0.158 | 0.0 | −0.036 |
| Mo$_2$P$_3$O$_{11}$ | 0.968 | 0.0 | 0.0 | 17.298 | −0.146 | 0.0 | −0.075 |
| Fe$_3$BO$_5$ | 0.955 | 0.003 | 0.003 | 0.473 | −0.154 | 0.0 | −0.02 |
| Fe$_2$B$_2$O$_5$ | 0.955 | 0.0 | 0.0 | 0.649 | −0.151 | 0.0 | −0.026 |
| BaZrO$_3$ | 0.912 | 0.0 | 0.0 | 11.926 | −0.149 | 0.0 | −0.025 |
| Sr$_2$SiO$_4$ | 0.898 | 0.0 | 0.0 | 4.495 | −0.132 | 0.0 | −0.048 |
| Mn$_3$(BO$_3$)$_2$ | 0.875 | 0.052 | 0.0 | 1.395 | −0.134 | 0.0 | −0.022 |

A decision tree analysis was applied to filter out additional materials under the following criteria:

(a) Oxygen instability at 200 C no more than 0.05 eV/atom;

(b) Elemental cost no more than $30/kg;

(c) H$_2$O reaction energy no more favorable than 0.001 eV/atom;

(d) Al$_2$O$_3$ reaction energy more favorable than 0.001 eV/atom; and (e) Overall reactivity metric better than the median.

The decision tree was trained on the overall reactivity metric, and the following estimation was found. A histogram of the target score (overall reactivity metric) was created and the most values were between −1 and 1. The validation score was plotted. To prevent overfitting, a randomized search algorithm with fivefold cross-validation was used.

Figure 6:
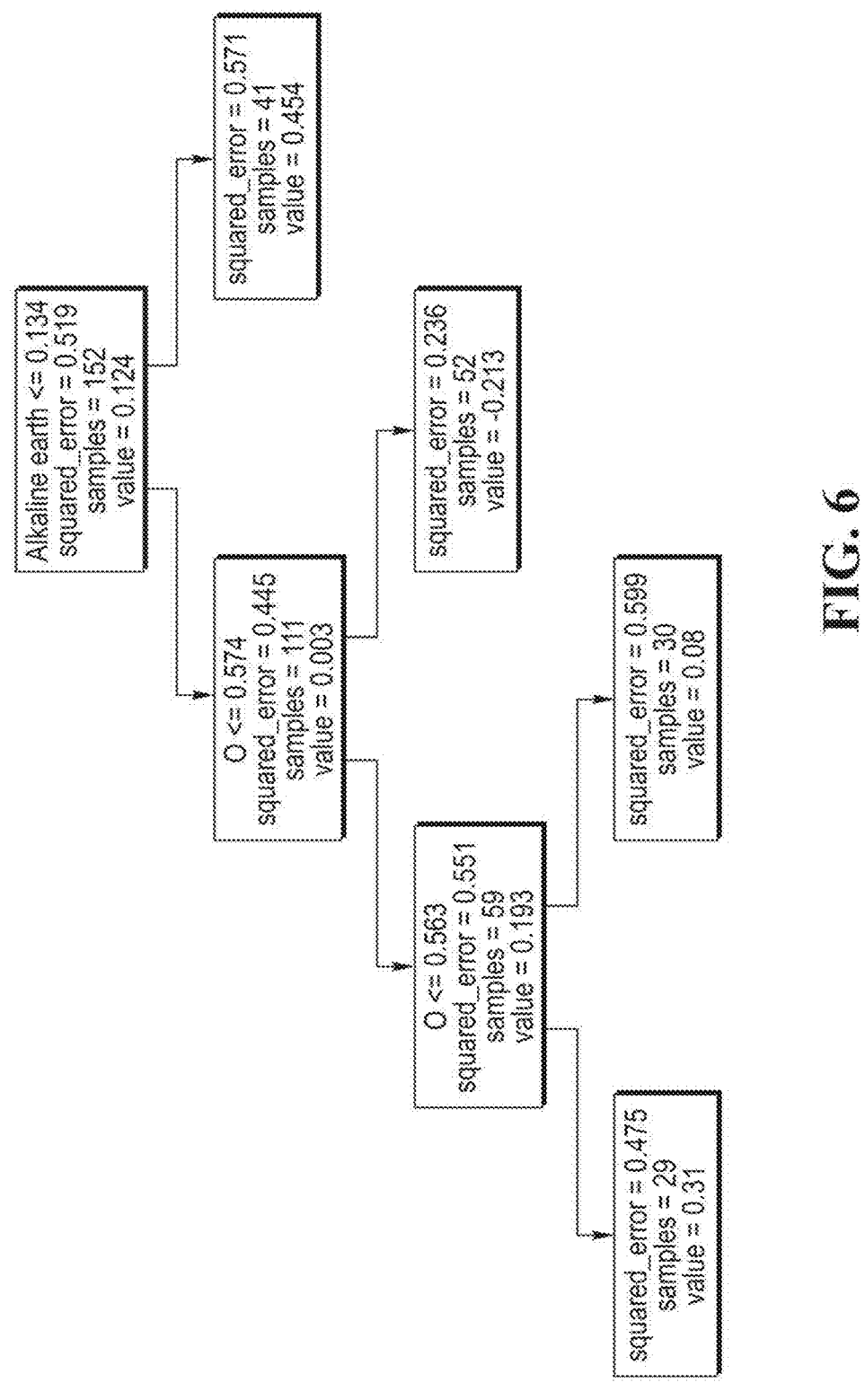
FIG. 6 shows a decision tree for the tested materials.

FIG. 6 shows the decision tree as learned. Darker squares indicate more preferred reactions and less undesired reactions. The following trends emerged:

High alkaline earth content (>13% molar) was advantageous, which was consistent with expectations formed by the results of the previous analysis, as Sr, Ba, are Mg suitable, and Lower oxygen content (<56% molar) was advantageous, which was consistent with expectations formed by the results of the previous analysis, as too much oxygen would prevent Cr$^{6+}$ from reacting/reducing.

Cr-Getter Material Improvement

The same analysis as described above was applied to a search space of SrNiO$_3$ and SrCoO$_3$, with 10% of the either Sr or Ni/Co, respectively, replaced by another nonradioactive metal. The goal was to identify potential improvements of Sr(Ni,Co)O$_3$ materials. All stable A$_x$B$_{2-x}$O$_{2<y<6}$ in the database with <$20/kg elemental cost were searched. The search revealed 234 materials.

Figure 7:
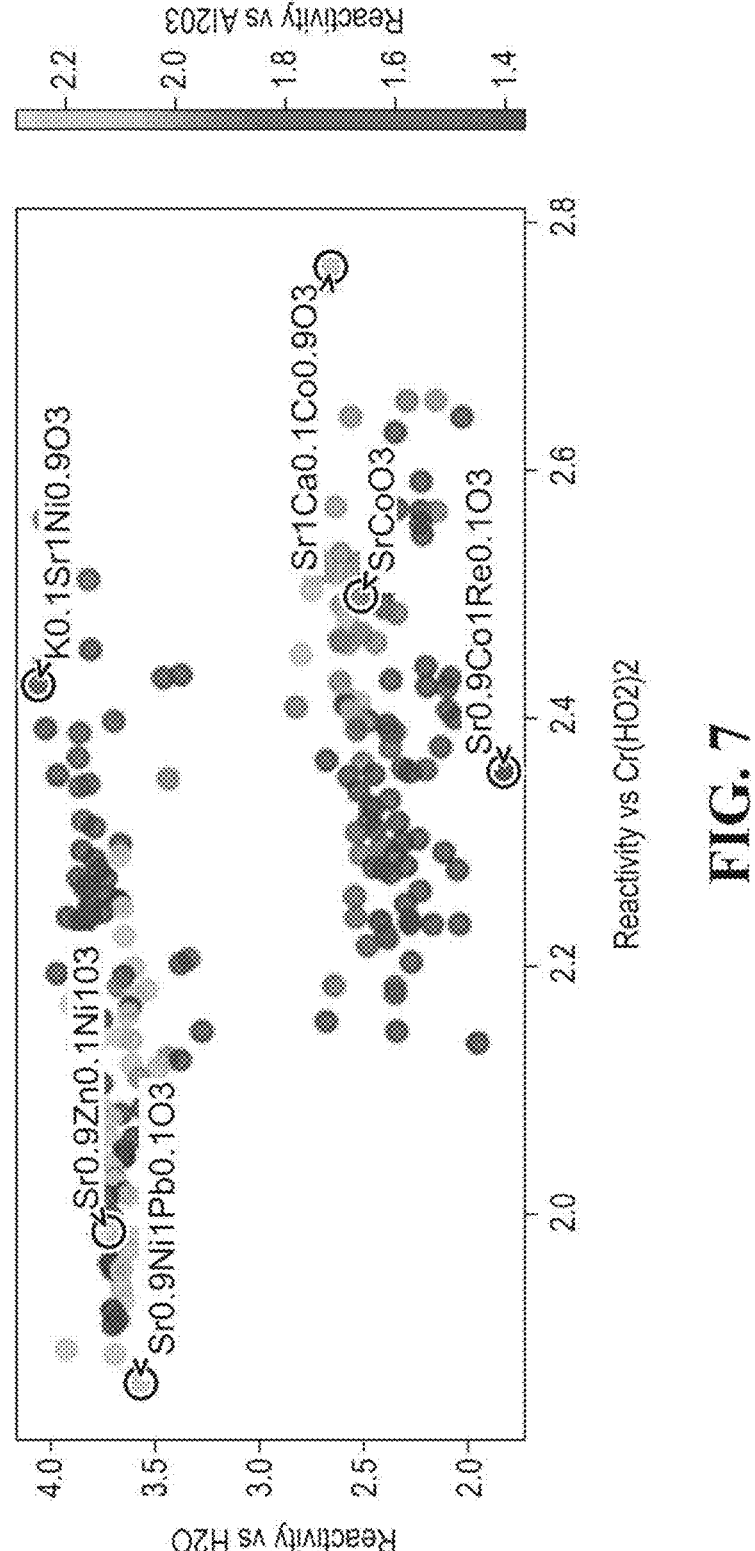
FIG. 7 shows a reactivity plot of the tested doped materials.

FIG. 7 and Table 3 show identified materials with respect to their reactivity with CrO$_2$(OH)$_2$, H$_2$O, and Al$_2$O$_3$. As can be seen from the Table 3 and FIG. 7, the base material may be nontrivially alloyed to achieve better performance in one of our three metrics. To promote the reaction with the chromium vapor, Ca may be added. To increase immunity towards H$_2$O, Re and/or W may be added. To promote better bonding to the aluminum chromium surface, Zn, Na, and/or Mg may be added. The desirable materials are located in the lower right corner of FIG. 7.

TABLE 3

Formulas and properties of example Cr-getter candidate materials

| Chemical formula | Reactivity vs Cr(HO$_2$)$_2$ | Reactivity vs H$_2$O | Reactivity vs Al$_2$O$_3$ |
|---|---|---|---|
| | High | Low | High |
| SrCa$_{0.1}$Co$_{0.9}$O$_3$ | 2.765 | 2.655 | 2.087 |
| SrCo$_{0.9}$Re$_{0.1}$O$_3$ | 2.643 | 2.022 | 1.559 |
| Na$_{0.1}$SrCo$_{0.9}$O$_3$ | 2.571 | 2.749 | 2.155 |
| SrCa$_{0.1}$Ni$_{0.9}$O$_3$ | 2.561 | 4.029 | 1.953 |
| SrMg$_{0.1}$Co$_{0.9}$O$_3$ | 2.517 | 2.739 | 2.113 |
| Sr$_{0.9}$Ca$_{0.1}$CoO$_3$ | 2.502 | 2.457 | 1.9 |
| SrCoO$_3$ | 2.5 | 2.5 | 2.0 |
| SrZn$_{0.1}$Co$_{0.9}$O$_3$ | 2.452 | 2.795 | 2.122 |
| SrCo$_{0.9}$W$_{0.1}$O$_3$ | 2.433 | 2.079 | 1.637 |
| Na$_{0.1}$SrNi$_{0.9}$O$_3$ | 2.389 | 3.857 | 1.853 |
| Sr$_{0.9}$CoRe$_{0.1}$O$_3$ | 2.357 | 1.819 | 1.356 |
| SrMg$_{0.1}$Ni$_{0.9}$O$_3$ | 2.345 | 3.857 | 1.877 |
| SrZn$_{0.1}$Ni$_{0.9}$O$_3$ | 2.318 | 3.842 | 1.881 |
| Na$_{0.1}$Sr$_{0.9}$CoO$_3$ | 2.291 | 2.51 | 1.958 |
| Sr$_{0.9}$Ca$_{0.1}$NiO$_3$ | 2.24 | 3.915 | 1.822 |
| Sr$_{0.9}$Mg$_{0.1}$CoO$_3$ | 2.24 | 2.531 | 1.922 |
| SrNiO$_3$ | 2.23 | 3.844 | 1.781 |
| SrRe$_{0.1}$Ni$_{0.9}$O$_3$ | 2.207 | 3.334 | 1.905 |

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A high temperature electrochemical cell comprising:
a solid electrolyte separating a cathode and an anode,
an anode flow field adjacent the anode,
a cathode flow field, having an exhaust gas stream pathway, downstream from the cathode, and
a thermal management system including a controller programmed to, in response to the exhaust gas stream temperature input exceeding a threshold, activate at least one component, configured to reduce temperature of the exhaust gas stream to a temperature within a threshold range corresponding to a temperature range promoting condensation of Cr-containing gas into solid, liquid, or aqueous $Cr_2O_3$ and $H_2CrO_4$,
the high temperature electrochemical cell having an operating temperature of about 600-1000° C.

2. The cell of claim 1, wherein the at least one component is a heat exchanger.

3. The cell of claim 1, wherein the at least one component comprises a container including an alkaline solution.

4. The cell of claim 1, wherein the at least one component is a highly porous structure configured to increase surface area available for the condensation.

5. The cell of claim 1, wherein the at least one component is located in the gas exhaust stream pathway.

6. The cell of claim 1, wherein the temperature range upper limit is about 120° C.

7. The cell of claim 1 further comprising a Cr-getter material, and the at least one component is located downstream from the Cr-getter material.

8. The cell of claim 1, wherein the cell is a solid oxide fuel cell.

9. A solid oxide fuel cell stack comprising:
a plurality of cells, at least some of which include:
a Cr-getter material in an exhaust gas stream pathway; and
a temperature management system including a controller programmed to, in response to exhaust gas stream temperature input, activate at least one component, located in an exhaust gas stream pathway and configured to reduce temperature of the exhaust gas stream to a temperature within a threshold range corresponding to a temperature range promoting condensation of Cr-containing gas into solid, liquid, or aqueous $Cr_2O_3$ and $H_2CrO_4$.

10. The cell of claim 9, wherein the Cr-getter material has a formula (Ia):

$$SrNi_yCo_{1-x-y}M_xO_3 \qquad (Ia),$$

where
M is a transition metal, alkali metal, or alkaline earth metal,
x is any number between 0.001 and 1.2, and
y is any number between 0 and 1.

11. The cell of claim 9, wherein the Cr-getter material is located upstream from the temperature management system.

12. The cell of claim 9, wherein the at least one component is a heat exchanger.

13. The cell of claim 9, wherein the at least one component comprises a liquid the exhaust gas stream passes through.

14. The cell of claim 9, wherein the at least one component is a highly porous structure arranged to increase surface area available for the condensation.

15. The cell of claim 9, wherein the at least one component is located in a cathode side of the cell.

16. A high temperature electrochemical cell cathode side comprising:
a flow field including a gas exhaust stream pathway;
a heat exchanger; and
a controller programmed to activate the heat exchanger which is configured to reduce a temperature of the gas exhaust stream pathway to a temperature within a predetermined temperature range promoting condensation of Cr-containing gas into solid, liquid, or aqueous $Cr_2O_3$ and $H_2CrO_4$ in response to the gas exhaust stream pathway temperature exceeding a threshold, and to recover waste heat by heating a medium.

17. The cathode side of claim 16, wherein the heat exchanger is located upstream from the cathode flow field outlet.

18. The cathode side of claim 16 further comprising a Cr-getter material.

19. The cathode side of claim 18, wherein the Cr-getter material has a formula (Ia):

$$SrNi_yCo_{1-x-y}M_xO_3 \qquad (Ia),$$

where
M is a transition metal, alkali metal, or alkaline earth metal,
x is any number between 0.001 and 1.2, and
y is any number between 0 and 1.

20. The cathode side of claim 16 further comprising a porous carbon structure.

* * * * *